United States Patent
Chang

(10) Patent No.: US 11,449,172 B1
(45) Date of Patent: Sep. 20, 2022

(54) TOUCH CONTROL APPARATUS AND TOUCH PANEL THEREOF

(71) Applicant: HIMAX TECHNOLOGIES LIMITED, Tainan (TW)

(72) Inventor: Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/503,378

(22) Filed: Oct. 18, 2021

Related U.S. Application Data

(60) Provisional application No. 63/214,794, filed on Jun. 25, 2021.

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
None
See application file for complete search history.

(56) References Cited

U.S. PATENT DOCUMENTS

| | | | |
|---|---|---|---|
| 10,067,603 B1 * | 9/2018 | Hsieh | G06F 3/04164 |
| 2016/0188031 A1 * | 6/2016 | Wang | G06F 3/0412 |
| | | | 345/174 |
| 2017/0185184 A1 * | 6/2017 | Kim | G06F 3/04166 |
| 2020/0026383 A1 | 1/2020 | Hwang et al. | |

FOREIGN PATENT DOCUMENTS

| | | |
|---|---|---|
| TW | I466600 | 12/2014 |
| TW | 202022583 | 6/2020 |
| TW | I728788 | 5/2021 |

OTHER PUBLICATIONS

"Notice of allowance of Taiwan Counterpart Application", dated May 31, 2022, p. 1-p. 6.

* cited by examiner

*Primary Examiner* — Krishna P Neupane
(74) *Attorney, Agent, or Firm* — JCIPRNET

(57) ABSTRACT

The invention provides a touch control apparatus and a touch panel thereof. The touch panel includes a plurality of pads and a plurality of sensing electrodes. The pads are suitable for being electrically connected to different pins of a touch driving device. The sensing electrodes are suitable for sensing a touch event of the touch panel. Any column of the sensing electrodes includes a plurality of sensing electrode groups. A plurality of sensing electrodes belonging to any one of the sensing electrode groups among the sensing electrodes are coupled to a corresponding one of the pads. The sensing electrodes in each of sensing electrode groups in a same column are dispersedly arranged in the same column. The arrangement of the sensing electrode groups in any column of the sensing electrodes is different from the arrangement of the sensing electrode groups in an adjacent column adjacent to the any column.

9 Claims, 4 Drawing Sheets

TOUCH CONTROL APPARATUS AND TOUCH PANEL THEREOF

CROSS-REFERENCE TO RELATED APPLICATION

This application claims the priority benefit of U.S. application Ser. No. 63/214,794, filed on Jun. 25, 2021. The entirety of the above-mentioned patent application is hereby incorporated by reference herein and made a part of this specification.

BACKGROUND

Technology Field

The disclosure relates to an electronic device, and particularly, to a touch control apparatus and a touch panel thereof.

Description of Related Art

Generally speaking, touch panels have a plurality of sensing electrodes. The sensing electrodes are used to sense a touch event. A plurality of analog-to-digital converters (ADCs) in a touch driving device are used to convert the sensing signals (touch sensing results) of the sensing electrodes into digital data. To reduce the circuit cost, generally the touch driving device uses a few analog-to-digital converters to process the sensing signals of more sensing electrodes in a time division multiplexing manner. For example, if a touch panel has 128 sensing electrodes and the touch driving device has 64 analog-to-digital converters, the 64 analog-to-digital converters need to perform two read operations (conversion operations) at different time points to convert the sensing signals of the 128 sensing electrodes into digital data. In other words, it takes the 64 analog-to-digital converters 2 units of time to convert the sensing signals of the 128 sensing electrodes into digital data. Reducing the quantity of analog-to-digital converters means that the processing time of the touch driving device may be increased.

Note that the content of the "related art" paragraph is used to facilitate the understanding of the disclosure. Part of the content (or all of the content) disclosed in the "related art" paragraph may not be the conventional technology known to those with ordinary knowledge in the technical field. The content disclosed in the "related art" paragraph does not mean that the content has been known to those with ordinary knowledge in the technical field before the application of the disclosure.

SUMMARY

In the disclosure, a touch control apparatus and a touch panel thereof are provided. The touch control apparatus and the touch panel can be used when the number of analog-to-digital converters (ADCs) of the touch driving device is limited, that is, when the number of pins of the touch driving device is limited, the number of times the touch driving device reads the touch panel is reduced (or the number of the pins of the touch driving device can be reduced when the number of times the touch driving device reads the touch panel is limited).

In an embodiment of the disclosure, the touch panel includes a plurality of pads and a plurality of sensing electrodes. The pads are suitable for being electrically connected to different pins of a touch driving device. The sensing electrodes are suitable for sensing a touch event of the touch panel. Any column of the sensing electrodes includes a plurality of sensing electrode groups. The sensing electrodes belonging to any one of the sensing electrode groups in the sensing electrodes are coupled to a corresponding pad of the pads. The sensing electrodes of each of the sensing electrode groups in a same column are dispersedly disposed in the same column. An arrangement of the sensing electrode groups in any column of the sensing electrodes is different from an arrangement of the sensing electrode groups in an adjacent column adjacent to the any column.

In an embodiment of the disclosure, the touch control apparatus includes a touch panel and a touch driving device. The touch panel includes a plurality of pads and a plurality of sensing electrodes. The sensing electrodes are suitable for sensing a touch event of the touch panel, and any column of the sensing electrodes includes a plurality of sensing electrode groups. A plurality of the sensing electrodes belonging to any one of the sensing electrode groups in the sensing electrodes are coupled to a corresponding pad of the pads. The sensing electrodes of each of the sensing electrode groups in a same column are dispersedly disposed in the same column. An arrangement of the sensing electrode groups in any column of the sensing electrodes is different from an arrangement of the sensing electrode groups in an adjacent column adjacent to the any column. A touch driving device includes a plurality of pins electrically connected to the pads, respectively. The touch driving device converts a plurality of touch sensing results received by the pins into a plurality of touch sensing data. In the case where current touch sensing data in the touch sensing data indicates that a touch event occurs to a current sensing electrode group corresponding to the current touch sensing data in the sensing electrode groups, the touch driving device checks whether the touch event also occurs to at least one first adjacent sensing electrode adjacent to a first current sensing electrode of the current sensing electrode group in the sensing electrodes to determine whether the touch event occurs to the first current sensing electrode.

In summary, the sensing electrodes of the touch panel according to the embodiments of the disclosure can be divided into a plurality of columns, and any one of the columns includes a plurality of sensing electrode groups. The sensing electrodes belonging to the same sensing electrode group can be coupled to a same pad. Therefore, when the number of analog-to-digital converters of the touch driving device is limited, that is, when the number of pins of the touch driving device is limited, the number of times the touch driving device reads the touch panel can be effectively reduced. Alternatively, when the number of times the touch driving device reads the touch panel is limited, the number of pins of the touch driving device (i.e., the number of pads of the touch panel) can be effectively reduced.

In order to make the features and advantages of the disclosure comprehensible, embodiments accompanied with drawings are described in detail below.

DESCRIPTION OF THE EMBODIMENTS

Figure 1:
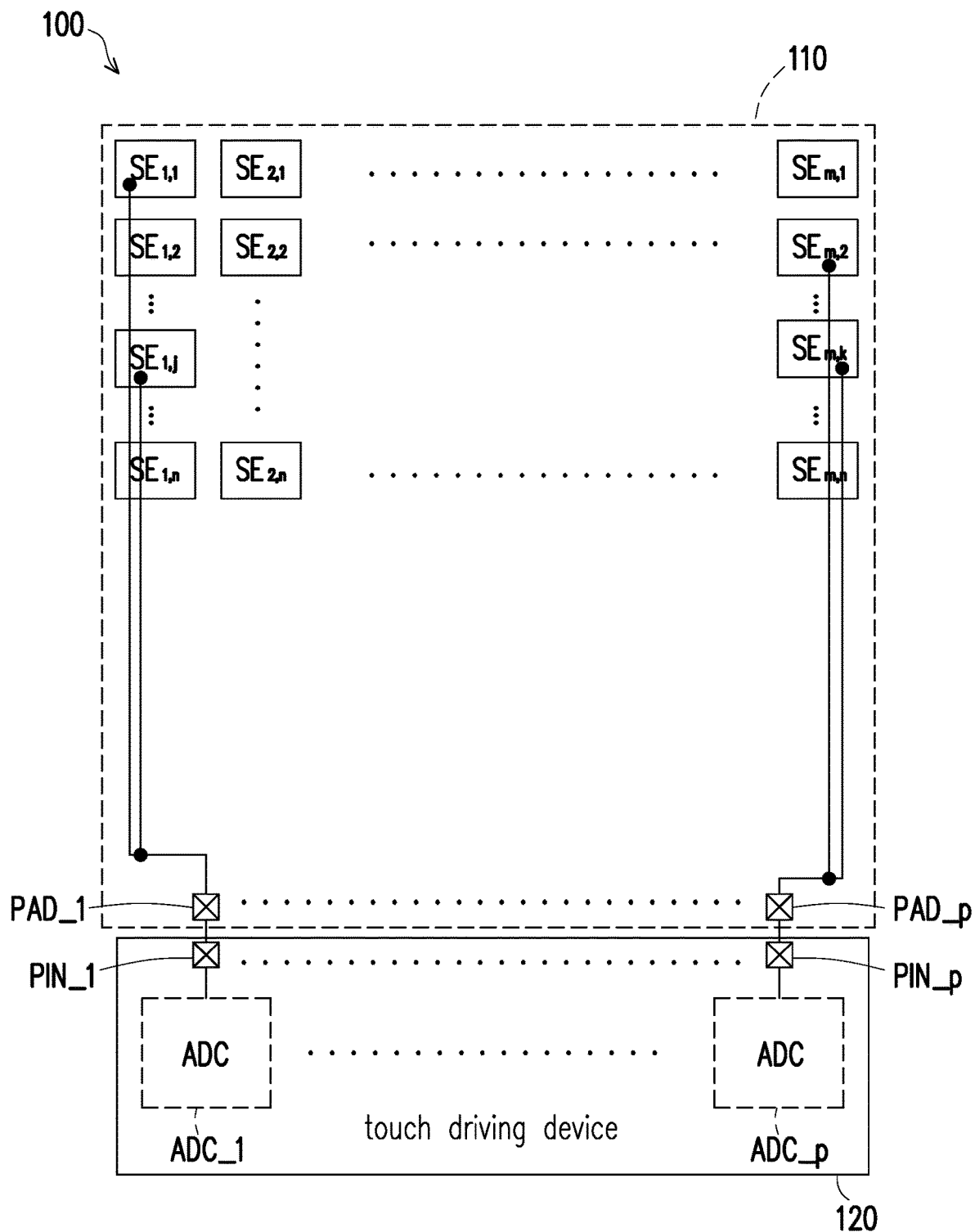
FIG. 1 is a schematic view of a circuit block of a touch control apparatus according to an embodiment of the disclosure.

The terms "couple/connect" used in this specification (including claims) may refer to any direct or indirect connection means. For example, "a first device is coupled (or connected) to a second device" should be interpreted as "the first device is directly connected to the second device" or "the first device is indirectly connected to the second device through other devices or connection means." The terms "first", "second", and so on used in this specification (including claims) are used to name the elements or distinguish different embodiments or ranges from each other, and should not be construed as the upper limit or lower limit of the number of the elements or as a limitation to the order of the elements. Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic view of a circuit block of a touch control apparatus 100 according to an embodiment of the disclosure. The touch control apparatus 100 shown in FIG. 1 includes a touch panel 110 and a touch driving device 120. The touch panel 110 has a plurality of sensing electrodes (i.e., a sensing electrode array), such as sensing electrodes $SE_{1,1}$, $SE_{1,2}$, ... $SE_{1,n}$, $SE_{2,1}$, $SE_{2,2}$, ..., $SE_{2,n}$, ..., $SE_{m,1}$, $SE_{m,2}$, ... to $SE_{m,n}$. The sensing electrodes $SE_{1,1}$ to $SE_{m,n}$ are suitable for sensing a touch event of the touch panel 110. The number m of columns and the number n of rows of the sensing electrodes $SE_{1,1}$ to $SE_{m,n}$ are integers determined according to the actual design. Note that although the geometric shapes of the sensing electrodes $SE_{1,1}$ to $SE_{m,n}$ shown in FIG. 1 are rectangular, in other embodiments the geometric shapes of the sensing electrodes $SE_{1,1}$ to $SE_{m,n}$ can be other shapes designed according to actual design. Furthermore, the layout of the sensing electrodes $SE_{1,1}$ to $SE_{m,n}$ (i.e., the geometric shape of the sensing electrode array) can also be determined according to the actual design.

The embodiment does not limit the implementation and details of the touch panel 110. For example, in some embodiments, the touch panel 110 may be an in-cell touch display panel or other touch panels. In some embodiments, the common voltage electrode of the in-cell touch display panel can be divided into a plurality of sub-electrodes, and the sub-electrodes can be used as the sensing electrodes $SE_{1,1}$ to $SE_{m,n}$.

The touch panel 110 also includes a plurality of pads, such as pads PAD_1, ... to PAD_p shown in FIG. 1. The pads PAD_1 to PAD_p are suitable for being electrically connected to different pins of the touch driving device 120, such as pins PIN_1, ... to PIN_p shown in FIG. 1. The number p of the pads PAD_1 to PAD_p (i.e., the number of pins PIN_1 to PIN_p) is an integer determined according to the actual design, and p is less than the number m*n of the sensing electrodes $SE_{1,1}$ to $SE_{m,n}$. For example, if the touch panel 110 has 128 sensing electrodes, and if each sensing electrode group has two sensing electrodes, the number p of the pads PAD_1 to PAD_p may be 64. If each sensing electrode group has four sensing electrodes, the number p of the pads PAD_1 to PAD_p can be 32.

The touch driving device 120 also includes a plurality of analog-to-digital converters (ADCs), such as analog-to-digital converters ADC_1, ... to ADC_p shown in FIG. 1. The input terminals of the analog-to-digital converters ADC_1 to ADC_p are respectively connected to the pins PAD_1 to PAD_p. The analog-to-digital converters ADC_1 to ADC_p can convert a plurality of touch sensing results (analog signals) received by the pins PAD_1 to PAD_p into a plurality of touch sensing data (digital data).

In the embodiment shown in FIG. 1, the sensing electrodes $SE_{1,1}$ to $SE_{m,n}$ have m columns, and any one of the m columns includes a plurality of sensing electrode groups. The number of sensing electrodes in each sensing electrode group can be determined according to the actual design. Among the sensing electrodes $SE_{1,1}$ to $SE_{m,n}$, all sensing electrodes belonging to the same sensing electrode group are commonly coupled to one corresponding pad of the pads PAD_1 to PAD_p. For example, if each sensing electrode group has two sensing electrodes, the sensing electrode $SE_{1,1}$ and the sensing electrode $SE_{1,j}$ (j is an integer ranging from 1 to n) belonging to the same sensing electrode group are commonly coupled to the pad PAD_1, and the sensing electrode $SE_{m,2}$ and the sensing electrode $SE_{m,k}$ (k is an integer ranging from 1 to n) belonging to another sensing electrode group are commonly coupled to the pad PAD_p.

The sensing electrodes of each sensing electrode group in a same column are dispersedly disposed in the same column. That is, all the sensing electrodes belonging to the same sensing electrode group are not adjacent to each other. For example, taking FIG. 1 as an example, the sensing electrodes $SE_{1,1}$ and the sensing electrodes $SE_{1,j}$ belonging to the same sensing electrode group in the first column are dispersedly disposed (the sensing electrode $SE_{1,1}$ is not adjacent to the sensing electrode $SE_{1,j}$), and the sensing electrode $SE_{m,2}$ and the sensing electrode $SE_{m,k}$ belonging to another sensing electrode group in the m-th column are dispersedly disposed (the sensing electrode $SE_{m,2}$ is not adjacent to the sensing electrode $SE_{m,k}$).

Moreover, the arrangement of the sensing electrode groups in any column of the sensing electrodes $SE_{1,1}$ to $SE_{m,n}$ is different from the arrangement of the sensing electrode groups in an adjacent column adjacent to the any column. For example, taking FIG. 1 as an example, the arrangement of the sensing electrode groups in the first column of the sensing electrodes $SE_{1,1}$ to $SE_{m,n}$ is different from the arrangement of the electrode groups in the second column (the adjacent column).

Figure 2:
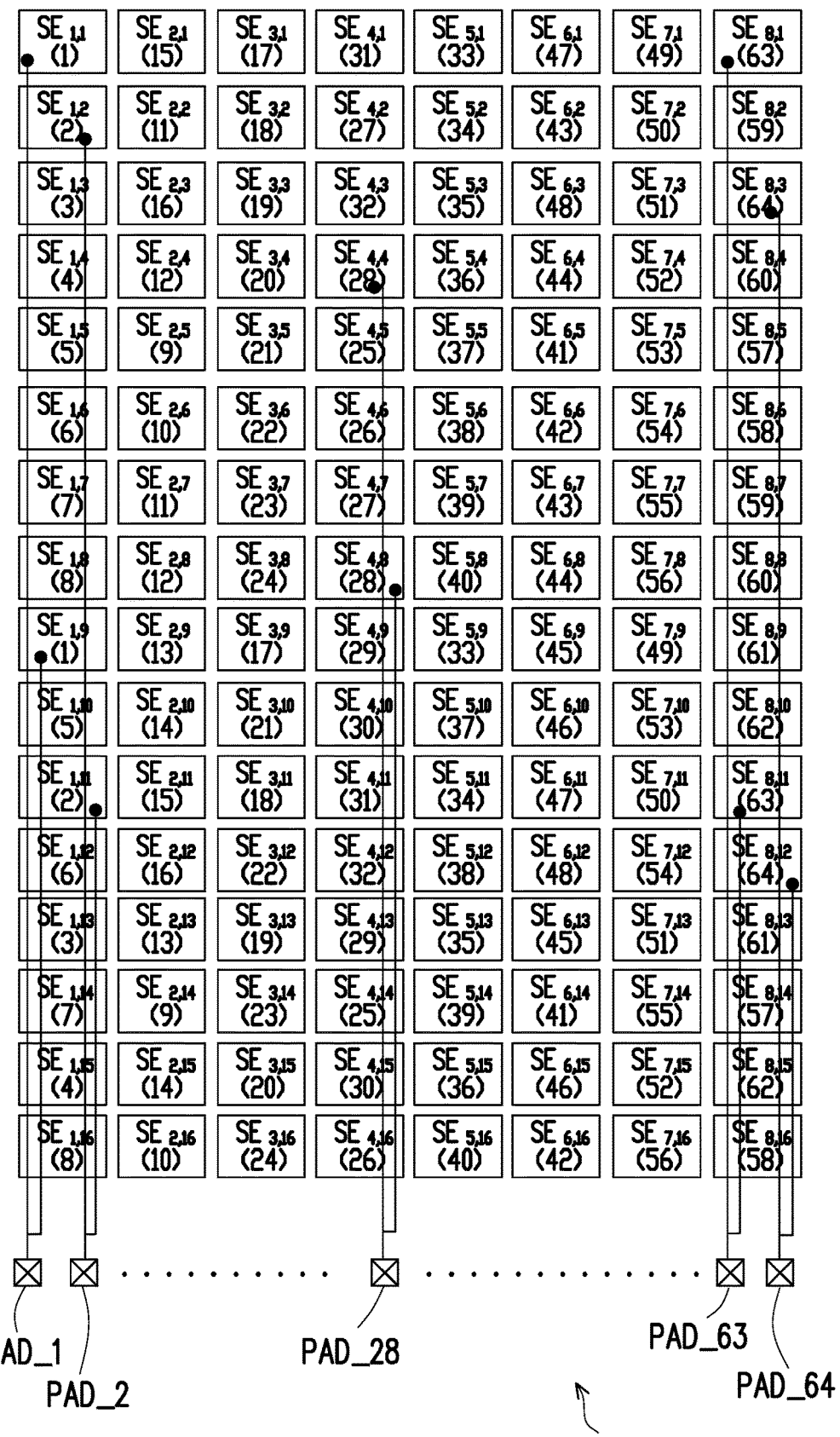
FIG. 2 is a schematic view illustrating a layout of sensing electrodes of the touch panel shown in FIG. 1 according to an embodiment of the disclosure.

For example, FIG. 2 is a schematic view illustrating the layout of the sensing electrodes of the touch panel 110 shown in FIG. 1 according to an embodiment of the disclosure. In the embodiment shown in FIG. 2, the touch panel 110 is assumed to have 128 sensing electrodes (i.e., 8/16 sensing electrodes $SE_{1,1}$ to $SE_{8,16}$), and the touch panel 110 is assumed to have 64 pads PAD_1 to PAD_64 (i.e., p=64). When the touch panel 110 is an in-cell touch display panel and in display driving, the sensing electrodes $SE_{1,1}$ to $SE_{8,16}$ can be used as common voltage electrodes of the in-cell touch display panel. In the embodiment shown in FIG. 2, the sensing electrodes $SE_{1,1}$ to $SE_{8,16}$ of the touch panel 110 are divided into 8 columns (i.e., m=8), and each column has 16 sensing electrodes (i.e., n=16).

Any column of the sensing electrodes $SE_{1,1}$ to $SE_{8,16}$ includes a plurality of sensing electrode groups. The number of sensing electrodes in each sensing electrode group can be determined according to the actual design. In the embodiment shown in FIG. 2, each sensing electrode group has two sensing electrodes. In each sensing electrode shown in FIG. 2, the number in parentheses indicates the sensing electrode group to which the sensing electrode belongs. For example, the sensing electrodes $SE_{1,2}$ and $SE_{1,11}$ shown in FIG. 2 are all marked with "2", which means that the sensing electrodes $SE_{1,2}$ and $SE_{1,11}$ belong to the same sensing electrode group (hereinafter the group marked "2" is called the second sensing electrode group). The sensing electrodes of each sensing electrode group in a same column are dispersedly disposed in the same column. All the sensing electrodes belonging to the same sensing electrode group are not adjacent to one another. In addition, the arrangement of the sensing electrode groups in any column of the sensing electrodes $SE_{1,1}$ to $SE_{8,16}$ is different from the arrangement of the sensing electrode groups in an adjacent column adjacent to any one of the columns. For example, taking FIG. 1 as an example, the arrangement of the sensing electrode groups in the first column of the sensing electrodes $SE_{1,1}$ to $SE_{8,16}$ is different from the arrangement of the sensing electrode groups in the second column (the adjacent column).

Among the sensing electrodes $SE_{1,1}$ to $SE_{8,16}$, all sensing electrodes belonging to the same sensing electrode group are commonly coupled to one corresponding pad of the pads PAD_1 to PAD_64. For example, the sensing electrodes $SE_{1,1}$ and $SE_{1,9}$ belonging to the first sensing electrode group are commonly coupled to the pad PAD_1, the sensing electrodes $SE_{1,2}$ and $SE_{1,11}$ belonging to the second sensing electrode group are commonly coupled to the pad PAD_2, the sensing electrodes $SE_{8,1}$ and $SE_{8,11}$ belonging to the 63rd sensing electrode group are commonly coupled to the pad PAD_63, the sensing electrodes $SE_{8,3}$ and the sensing electrodes $SE_{8,12}$ belonging to the 64th sensing electrode group are commonly coupled to the pad PAD_64, and the disposition way can be applied to the rest of the sensing electrode groups.

Referring to FIG. 1 and FIG. 2, the 64 pins PIN_1 to PIN_64 (i.e., p=64) of the touch driving device 120 are electrically connected to the 64 pads PAD_1 to PAD_64 of the touch panel 110, respectively. The touch driving device 120 can convert a plurality of touch sensing results received by the pins PIN_1 to PIN_64 into a plurality of touch sensing data. The touch driving device 120 can check the touch sensing data to determine whether a touch event occurs to the touch panel 110. For example, when the touch sensing data corresponding to the pad PAD_1 is greater than the threshold value, the touch driving device 120 can determine that the touch event occurs to the first sensing electrode group (i.e., the sensing electrodes $SE_{1,1}$ and $SE_{1,9}$).

When one piece of the current touch sensing data in the touch sensing data indicates that "the touch event occurs to the current sensing electrode group corresponding to the current touch sensing data in the sensing electrode groups", the touch driving device 120 can check whether the touch event also occurs to at least one sensing electrode (e.g., referred to the first adjacent sensing electrode) of the sensing electrodes $SE_{1,1}$ to $SE_{8,16}$ adjacent to one sensing electrode (e.g., referred to as the first current sensing electrode) of the current sensing electrode groups to determine whether the touch event occurs to the first current sensing electrode. For example, when the current touch sensing data indicates that a touch event occurs, and when the touch event also occurs to the first adjacent sensing electrode, the touch driving device 120 can determine the touch event occurs to the first current sensing electrode. In contrast, when the current touch sensing data indicates that a touch event occurs, and when no touch event occurs to the first adjacent sensing electrode, the touch driving device 120 can determine no touch event occurs to the first current sensing electrode.

If an object (e.g. a finger or an active stylus) touches the sensing electrodes $SE_{4,4}$ of the touch panel 110. The sensing electrodes $SE_{4,4}$ and the sensing electrodes $SE_{4,8}$ belonging to the same sensing electrode group are commonly coupled to the same pad PAD_28, that is, the sensing electrodes $SE_{4,4}$ and $SE_{4,8}$ have the same touch sensing data. The touch driving device 120 can learn that a touch event occurs to one of the sensing electrodes $SE_{4,4}$ and $SE_{4,8}$ based on the touch sensing data. When the object touches the sensing electrodes $SE_{4,4}$, except that it is determined that the touch event occurs to the sensing electrodes $SE_{4,4}$, it may be misjudged that the touch event occurs to the sensing electrodes $SE_{4,8}$. To eliminate misjudgments, the touch driving device 120 can further check the sensing electrodes $SE_{4,4}$ adjacent to the sensing electrodes $SE_{3,4}$, $SE_{4,3}$, $SE_{4,5}$, and $SE_{5,4}$ and/or the sensing electrode $SE_{4,8}$ adjacent to the sensing electrodes $SE_{3,8}$, $SE_{4,7}$, $SE_{4,9}$ and $SE_{5,8}$.

If the object touches the sensing electrodes $SE_{4,4}$ of the touch panel 110, the touch of the object may affect the sensing electrodes $SE_{3,4}$, $SE_{4,3}$, $SE_{4,5}$ and $SE_{5,4}$ adjacent to the sensing electrodes $SE_{4,4}$, and this even results in the touch sensing data of the sensing electrodes $SE_{3,4}$, $SE_{4,3}$, $SE_{4,5}$ and $SE_{5,4}$ adjacent to the sensing electrode $SE_{4,4}$ is greater than the threshold value. That is, when the object touches the sensing electrodes $SE_{4,4}$, besides that it is determined that the touch event occurs to the sensing electrodes $SE_{4,4}$, it is also determined that the touch event occurs to the sensing electrodes $SE_{3,4}$, $SE_{4,3}$, $SE_{4,5}$ and $SE_{5,4}$. Therefore, the touch driving device 120 can check whether the touch event also occurs to the sensing electrodes $SE_{3,4}$, $SE_{4,3}$, $SE_{4,5}$ and/or $SE_{5,4}$ (the first adjacent sensing electrode) adjacent to the sensing electrode $SE_{4,4}$ of the current sensing electrode groups. When the current touch sensing data indicates that the touch event occurs to the sensing electrode $SE_{4,4}$, and when the touch event also occurs to the sensing electrode $SE_{3,4}$, $SE_{4,3}$, $SE_{4,5}$ and/or $SE_{5,4}$, the touch driving device 120 can determine that the touch event occurs to the sensing electrode $SE_{4,4}$.

In contrast, for the sensing electrodes $SE_{4,8}$ (the second current sensing electrode of the current sensing electrode group) belonging to the same sensing electrode group, because the object does not actually touch $SE_{4,8}$, the touch sensing data of adjacent sensing electrodes $SE_{3,8}$, $SE_{4,7}$, $SE_{4,9}$ and $SE_{5,8}$ may not exceed the threshold (i.e., it is determined that no touch event occurs to the sensing electrodes $SE_{3,8}$, $SE_{4,7}$, $SE_{4,9}$ and $SE_{5,8}$). When the current touch sensing data indicates that a touch event occurs to the sensing electrodes $SE_{4,4}$ and $SE_{4,8}$, besides checking the adjacent sensing electrodes $SE_{3,4}$, $SE_{4,3}$, $SE_{4,5}$ and $SE_{5,4}$ of the sensing electrodes $SE_{4,4}$, the touch driving device 120 can also further check whether the touch event also occurs to the adjacent sensing electrodes $SE_{3,8}$, $SE_{4,7}$, $SE_{4,9}$ and $SE_{5,8}$ of the sensing electrodes $SE_{4,8}$ to determine whether the touch event occurs to the sensing electrodes $SE_{4,4}$ or $SE_{4,8}$.

When the current touch sensing data indicates that the touch event occurs to the sensing electrodes $SE_{4,4}$ and $SE_{4,8}$, and when no touch event occurs to the adjacent sensing electrodes $SE_{3,8}$, $SE_{4,7}$, $SE_{4,9}$, and $SE_{5,8}$, the touch driving device 120 can determine that no touch event occurs to the sensing electrode $SE_{4,8}$. Alternatively, when the current touch sensing data indicates that the touch event occurs to the sensing electrodes $SE_{4,4}$ and $SE_{4,8}$, and when it is determined that no touch event occurs to the sensing electrodes $SE_{4,8}$ of the current sensing electrode group, the touch driving device 120 can determine that the touch event occurs to the sensing electrodes $SE_{4,4}$ of the current sensing electrode group. After determining that the touch event occurs to the sensing electrodes $SE_{4,4}$, the touch driving device 120 can determine the touch position of the object based on the size of the touch sensing data of the sensing electrodes $SE_{4,4}$, $SE_{3,4}$, $SE_{4,3}$, $SE_{4,5}$, and $SE_{5,4}$.

Figure 3:
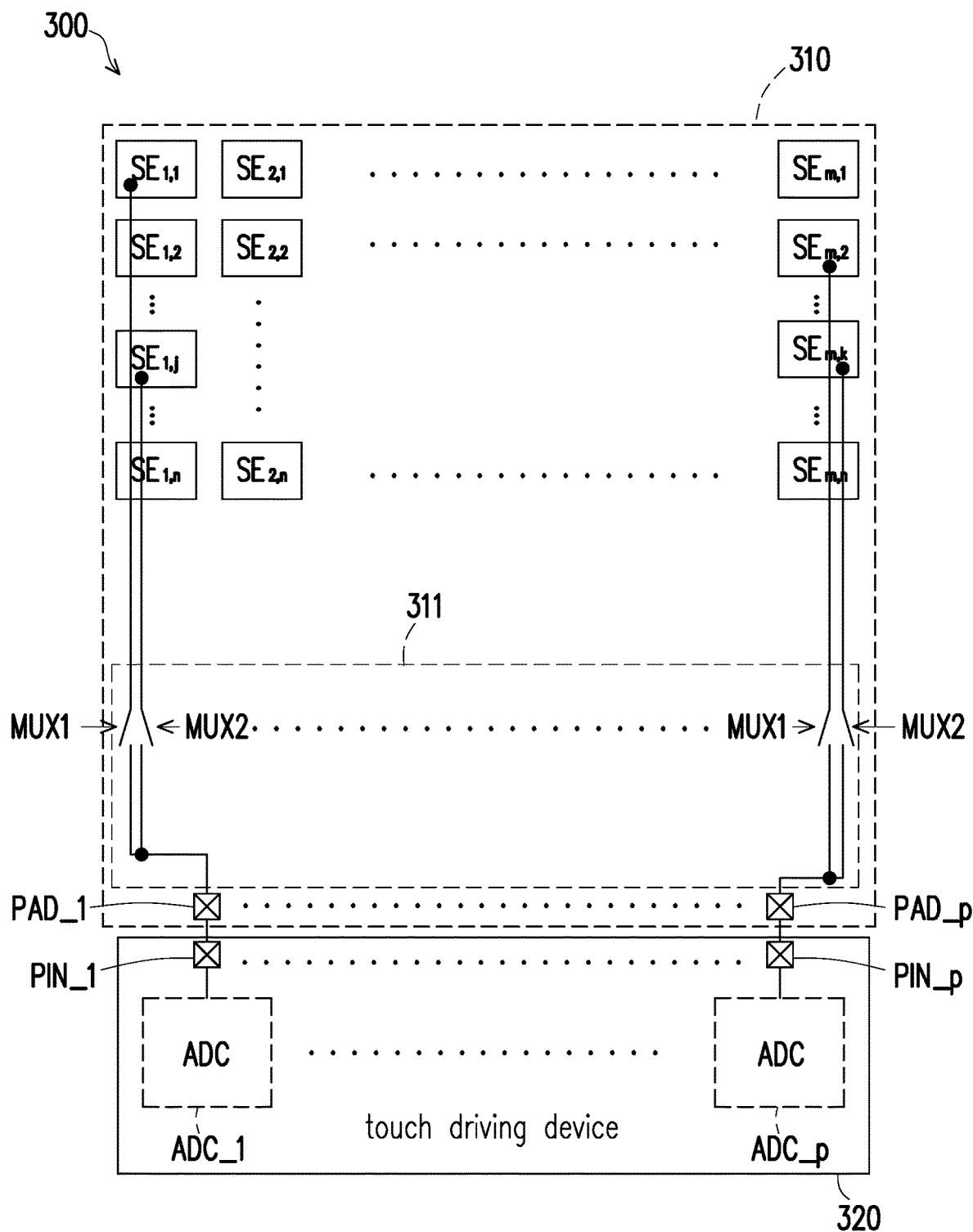
FIG. 3 is a schematic view of a circuit block of a touch control apparatus according to another embodiment of the disclosure.

FIG. 3 is a schematic view of a block circuit of a touch control apparatus 300 according to another embodiment of the disclosure. The touch control apparatus 300 shown in FIG. 3 includes a touch panel 310 and a touch driving device 320. For the description of the touch control apparatus 300, the touch panel 310, and the touch driving device 320 shown in FIG. 3, refer to the related descriptions of the touch control apparatus 100, the touch panel 110, and the touch driving device 120 shown in FIG. 1 and FIG. 2, which is not iterated herein. Different from the touch panel 110 shown in FIG. 1, the touch panel 310 shown in FIG. 3 further includes a routing circuit 311. The routing circuit 311 has a plurality of selection terminals coupled to the sensing electrodes $SE_{1,1}$ to $SE_{m,n}$. The routing circuit 311 has a plurality of common terminals coupled to the pads PAD_1 to PAD_p. The routing circuit 311 is configured to selectively couple a plurality of sensing electrodes belonging to the same sensing electrode group to a corresponding pad of the pads PAD_1 to PAD_p. For example, the pads PAD_1 to PAD_p are controlled by control signals MUX1 and MUX2 to operate in one of a plurality of modes.

Figure 4:
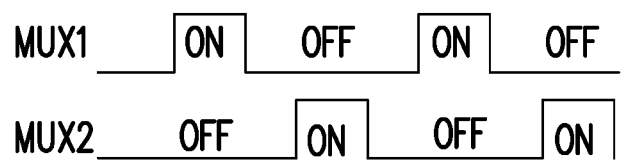
FIG. 4 is a schematic view of the timing sequence of the control signals shown in FIG. 3 in the first operation mode according to an embodiment of the disclosure.

FIG. 4 is a schematic view of the timing sequence of the control signals MUX1 and MUX2 in the first operation mode shown in FIG. 3 according to an embodiment of the disclosure. The horizontal axis shown in FIG. 4 represents time. "ON" in FIG. 4 indicates a turn on switch, and "OFF" in FIG. 4 indicates a turn off switch. Referring to FIG. 3 and FIG. 4, in the first operation mode, different sensing electrodes belonging to the same sensing electrode group are coupled to the same corresponding pad at different time.

Figure 5:
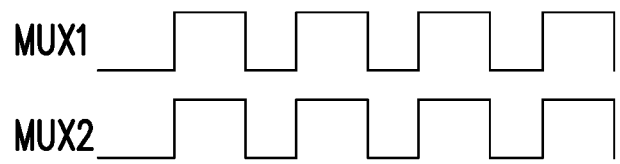
FIG. 5 is a schematic view of the timing sequence of the control signals shown in FIG. 3 in the second operation mode according to another embodiment of the disclosure.

FIG. 5 is a schematic view of the timing sequence of the control signals MUX1 and MUX2 shown in FIG. 3 in the second operation mode according to another embodiment of the disclosure. The horizontal axis shown in FIG. 5 represents time. Referring to FIG. 3 and FIG. 5, in the second operation mode, all sensing electrodes belonging to the same sensing electrode group are coupled to the same corresponding pad at the same time.

According to different design requirements, the touch driving device 120 and/or 320 can be implemented in the form of hardware, firmware, software (i.e., programs), or a combination thereof in plurality. In the form of hardware, the touch driving device 120 and/or 320 may be implemented in a logic circuit on an integrated circuit. The related functions of the touch driving device 120 and/or 320 can be implemented as hardware by utilizing hardware description languages (e.g., Verilog HDL or VHDL) or other suitable programming languages. For example, the related functions of the touch driving device 120 and/or 320 can be implemented in one or more controllers, microcontrollers, microprocessors, application-specific integrated circuit (ASIC), digital signal processor (DSP), field programmable gate array (FPGA) and/or various logic blocks, modules, and circuits in other processing units. In the form of software and/or firmware, the related functions of the touch driving device 120 and/or 320 can be implemented as programming codes. For example, general programming languages (e.g., C, C++ or combination languages) or other suitable programming languages are used to implement the touch driving device 120 and/or 320.

In summary, the plurality of sensing electrodes $SE_{1,1}$ to $SE_{m,n}$ of the touch panel 110 (or 310) in the embodiments can be divided into m columns, and any one of the columns includes a plurality of sensing electrode groups. For example, in each of the sensing electrodes $SE_{1,1}$ to $SE_{8,16}$ shown in FIG. 2, the numbers in parentheses represent the reference numerals of the sensing electrode group. A plurality of sensing electrodes belonging to the same sensing electrode group can be coupled to the same pad. Therefore, when the number of analog-to-digital converters of the touch driving device 120 (or 320) is limited, that is, when the number of pins PIN_1 to PIN_p of the touch driving device 120 (or 320) is limited, the number of times the touch driving device 120 (or 320) reads the touch panel 110 (or 310) can be effectively reduced. Alternatively, when the number of times of reading the touch panel 110 (or 310) is limited, the number of pins PIN_1 to PIN_p of the touch driving device 120 (or 320) (i.e., the number of the pads PAD_1 to PAD_p of the touch panel) can be effectively reduced.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A touch panel, comprising:
   a plurality of pads suitable for being electrically connected to different pins of a touch driving device; and
   a plurality of sensing electrodes suitable for sensing a touch event of the touch panel, wherein any column of the sensing electrodes comprises a plurality of sensing electrode groups, a plurality of sensing electrodes belonging to any one of the sensing electrode groups in the sensing electrodes are coupled to a corresponding pad of the pads, the sensing electrodes of each of the sensing electrode groups in a same column are dispersedly disposed in the same column, and an arrangement of the sensing electrode groups in any column of the sensing electrodes is different from an arrangement of the sensing electrode groups in an adjacent column adjacent to the any column.

2. The touch panel according to claim 1, further comprising:
   a routing circuit comprising a plurality of selection terminals coupled to the sensing electrodes, and a plurality of common terminals coupled to the pads, wherein the routing circuit is configured to selectively couple the sensing electrodes belonging to a same sensing electrode group to a corresponding pad of the pads.

3. The touch panel according to claim 1, wherein the touch panel is an in-cell touch display panel, and the sensing electrodes are used as a common voltage electrode of the in-cell touch display panel.

4. A touch control apparatus, comprising:
   a touch panel comprising a plurality of pads and a plurality of sensing electrodes, wherein the sensing electrodes are suitable for sensing a touch event of the touch panel, and any column of the sensing electrodes comprises a plurality of sensing electrode groups, a plurality of sensing electrodes belonging to any one of the sensing electrode groups in the sensing electrodes are coupled to a corresponding pad of the pads, the sensing electrodes of each of the sensing electrode groups in a same column are dispersedly disposed in the same column, and an arrangement of the sensing electrode groups in any column of the sensing electrodes is different from an arrangement of the sensing electrode groups in an adjacent column adjacent to the any column; and a touch driving device comprising a plurality of pins electrically connected to the pads, respectively, wherein the touch driving device converts a plurality of touch sensing results received by the pins into a plurality of touch sensing data, and in the case where current touch sensing data in the touch sensing data indicates that a touch event occurs to a current sensing electrode group corresponding to the current touch sensing data in the sensing electrode groups, the touch driving device checks whether the touch event also occurs to at least one first adjacent sensing electrode adjacent to a first current sensing electrode of the current sensing electrode group in the sensing electrodes to determine whether the touch event occurs to the first current sensing electrode.

5. The touch control apparatus according to claim 4, wherein when the current touch sensing data indicates that the touch event occurs, and when the touch event also occurs to the at least one first adjacent sensing electrode, the touch driving device determines that the touch event occurs to the first current sensing electrode; and when the current touch sensing data indicates that the touch event occurs, and when no touch event occurs to the at least one first adjacent sensing electrode, the touch driving device determines that no touch event occurs to the first current sensing electrode.

6. The touch control apparatus according to claim 5, wherein when the current touch sensing data indicates that the touch event occurs, and when it is determined that no touch event occurs to the first current sensing electrode, the touch driving device determines that the touch event occurs to a second current sensing electrode of the current sensing electrode group.

7. The touch control apparatus according to claim 4, wherein when the current touch sensing data indicates that the touch event occurs, the touch driving device further checks whether the touch event occurs to at least one second adjacent sensing electrode adjacent to a second current sensing electrode of the current sensing electrode group in the sensing electrodes to determine whether the touch event occurs to the second current sensing electrode.

8. The touch control apparatus according to claim 7, wherein when the current touch sensing data indicates that the touch event occurs, and when the touch event also occurs to the at least one second adjacent sensing electrode, the touch driving device determines that the touch event occurs to the second current sensing electrode; and when the current touch sensing data indicates that the touch event occurs, and when no touch event occurs to the at least one second adjacent sensing electrode, the touch driving device determines that no touch event occurs to the second current sensing electrode.

9. The touch control apparatus according to claim 4, wherein the touch panel is an in-cell touch display panel, and the sensing electrodes are used as a common voltage electrode of the in-cell touch display panel.

* * * * *